United States Patent
Jazayeri et al.

(10) Patent No.: US 8,190,908 B2
(45) Date of Patent: May 29, 2012

(54) SECURE DATA VERIFICATION VIA BIOMETRIC INPUT

(75) Inventors: Mehdi Jazayeri, Atherton, CA (US); Jeremy Isaac Nathaniel Werner, San Jose, CA (US); Kiran Madhav, Sunnyvale, CA (US)

(73) Assignee: Spansion LLC, Sunnyvale, CA (US)

( * ) Notice: Subject to any disclaimer, the term of this patent is extended or adjusted under 35 U.S.C. 154(b) by 866 days.

(21) Appl. No.: 11/613,627

(22) Filed: Dec. 20, 2006

(65) Prior Publication Data

US 2008/0155268 A1     Jun. 26, 2008

(51) Int. Cl.
*G06F 21/00* (2006.01)
(52) U.S. Cl. ........................................ 713/186
(58) Field of Classification Search .................... 713/186
See application file for complete search history.

(56) References Cited

U.S. PATENT DOCUMENTS

| | | | | |
|---|---|---|---|---|
| 5,872,834 A * | 2/1999 | Teitelbaum | | 379/93.03 |
| 6,601,173 B1 * | 7/2003 | Mohler | | 726/7 |
| 2002/0120850 A1 * | 8/2002 | Walker et al. | | 713/178 |
| 2003/0023882 A1 * | 1/2003 | Udom | | 713/202 |
| 2003/0053665 A1 * | 3/2003 | Hamid | | 382/124 |
| 2003/0115490 A1 * | 6/2003 | Russo et al. | | 713/202 |
| 2004/0010462 A1 * | 1/2004 | Moon et al. | | 705/39 |
| 2005/0109841 A1 * | 5/2005 | Ryan et al. | | 235/380 |
| 2005/0216651 A1 * | 9/2005 | Tanabiki et al. | | 711/100 |
| 2006/0219776 A1 * | 10/2006 | Finn | | 235/380 |

\* cited by examiner

*Primary Examiner* — Michael S McNally
(74) *Attorney, Agent, or Firm* — Turocy & Watson, LLP

(57) ABSTRACT

An architecture is presented that controls access to secure data via biometric verification. The system comprises a memory module that communicates with biometric data to establish a heightened level of security for controlling access to data stored in the non-volatile memory. The memory module includes a security processor, non-volatile memory, and volatile memory. The security processor provides for concurrent processing of security protocols, provides a secure execution environment within the memory module to evaluate and store biometric data, communicates with the biometric data sensors to fetch the biometric data, and analyzes the biometric data to control access to data stored in the non-volatile memory. Specifically, biometric data is input and communicated to the security processor, then compared against the existing biometric templates stored in the non-volatile memory. If the data matches, verification is sent to the external processor and the user is granted access to the secure assets.

23 Claims, 9 Drawing Sheets

SECURE DATA VERIFICATION VIA BIOMETRIC INPUT

BACKGROUND

Robust security is imperative for network-based systems, particularly for applications that deal with sensitive information, to prevent unauthorized agents from intercepting, corrupting or publishing sensitive data. A suitable information security system must perform with minimum disruption to users to ensure that authorized users are neither erroneously denied access nor unduly restricted in their duties.

Furthermore, biometric data has long been in use to provide additional security. Biometric data measures and analyzes human physical characteristics for authentication purposes. Biometric data includes fingerprints, eye retinas and irises, facial patterns and hand measurements. However, concerns about identity theft through biometric data have not been resolved.

Accordingly, a problem common to security-based systems and biometric data is the vulnerability of the security functionality. Compromise of the security functionality and biometric data results in system failures, loss of privacy, data loss, fraud, and identity theft. This is a major concern, since attackers using techniques ranging from simple to sophisticated have compromised a wide variety of existing systems, resulting in the intercepting, misuse, corrupting or publishing of sensitive data. Therefore, there is a continuing need to include adequate security mechanisms to protect such systems and biometric data.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a system that controls access to secure data or applications via biometric verification. The system comprises a memory module that communicates with biometric data sensors to establish a heightened level of security for controlling access to data and assets stored in the non-volatile memory. The memory module includes a security processor, non-volatile memory, and volatile memory. The security processor provides for concurrent processing of security protocols, provides a secure execution environment within the memory module to evaluate and store biometric data, communicates either directly or indirectly with the biometric data sensors to fetch the biometric data, and analyzes the biometric data to control access to data or applications stored in the non-volatile memory. Specifically, biometric data is input and communicated to the security processor. The biometric data is then compared against the biometric data stored in the non-volatile memory. If the data matches, verification is sent to the external processor, and the user or system is granted access to the secure assets stored in the non-volatile memory.

Further, the non-volatile memory component can be divided into multiple partitions of varying sizes and access rights. Accordingly, security software is stored in a first partition, the secure data is stored in a second partition, and the biometric data is stored in a third partition. The secure data and biometric data could also be stored in the same partition.

As the security processor controls access to the entire non-volatile memory space and monitors all traffic to and from the non-volatile memory components, the security processor is able to manage access to the secure assets stored in the non-volatile memory.

In another implementation of the claimed subject matter, the biometric data is utilized to control access to user account information. A user selects a payment menu on a mobile device to make a purchase and selects an account to use. The details of the account would be stored inside the non-volatile memory, embedded in the mobile device. Biometric data is used to authenticate the user prior to transferring or enabling access to the account information. The user then places the mobile device within the range of a transaction terminal, and the transaction is complete.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
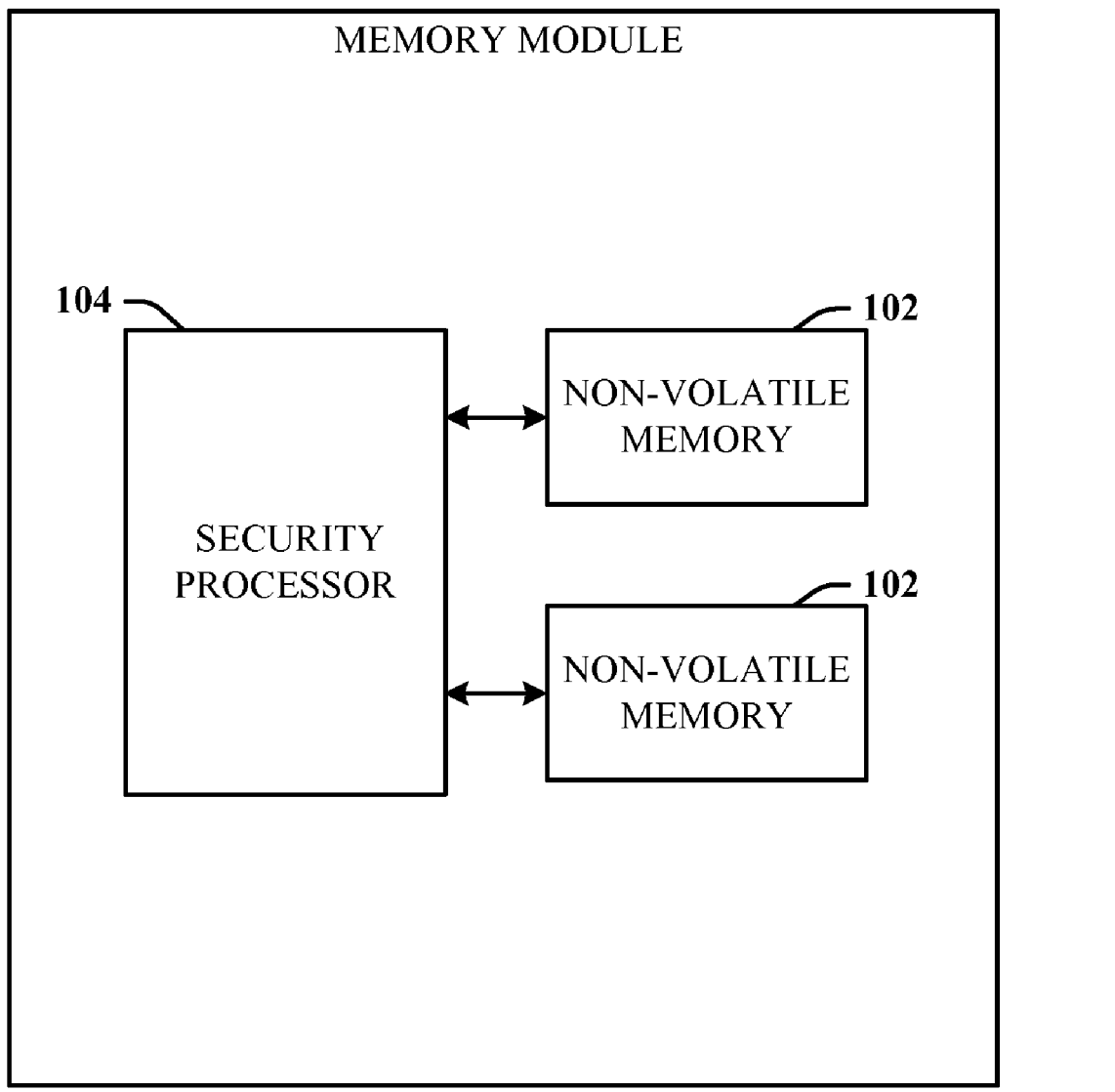
FIG. 1 illustrates a block diagram of a memory module.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component," "handler," "model," "system," and the like are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Additionally, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer-readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the claimed subject matter.

As used herein, terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Security is imperative for network-based systems, particularly for applications that deal with sensitive information, to prevent unauthorized agents, in the form of hardware and/or software, from intercepting, misusing, corrupting or publishing sensitive data. As stated supra, suitable information security system must perform with minimum disruption to users to ensure that authorized users are neither erroneously denied access nor unduly burdened or restricted in their duties. Accordingly, the following subject matter optimizes processor utilization and communicates with biometric data to establish a heightened level of security for access control of data.

A memory module that facilitates integrated security capabilities in a mobile device is disclosed. The memory module arbitrates with an external processor located outside of the memory module for access to the non-volatile memory. Security software, secure data and biometric data are stored in the non-volatile memory. The security processor provides for concurrent processing of security protocols and comparison of biometric data while the external processor executes normal functions, alleviating the external processor from having to execute functions associated with security functions. The memory module acting as proxy for the external processor enables a heightened level of security for communications utilizing the biometric data. The memory module is a tamper-resistant and trusted secure environment and its use within the system by the external processor can prevent fraud, abuse, and theft.

Referring initially to the drawings, FIG. 1 illustrates a memory module 100 that facilitates integrated security capabilities in accordance with an innovative aspect. The memory module is a package containing one or multiple chips of integrated circuits or semiconductors, wherein one integrated circuit houses a security processor 104 and another integrated circuit houses non-volatile memory 102. The integrated circuits are then coupled together to form the memory module 100. Optionally, the security processor 104 and the non-volatile memory 102 could be housed on one integrated circuit.

Furthermore, the non-volatile memory 102 of the memory module 100 stores security software, such as the biometric template generation, validation and matching algorithms, for use by the security processor 104. The non-volatile memory 102 also stores secure data and biometric data or templates. The biometric templates include iris data, face data, fingerprint data, DNA, or any other human physical characteristic which can be used for authentication and/or identification purposes. The biometric data is compared against the template and the result is then used for controlling access to the secure assets stored in the non-volatile memory 102. The non-volatile memory 102 is typically flash memory, but can be any type of non-volatile memory typically used for the task of secondary storage, or long-term persistent storage. Furthermore, one or more non-volatile memory 102 can be included in the memory module 100. If more than one non-volatile memory 102 is included, the non-volatile memory 102 is not required to be of the same type and/or density.

The non-volatile memory 102 may also be divided into multiple partitions of varying sizes and access rights. Secure partitioning is utilized to protect essential data and code, secure sensitive information, and allow easy access to common public data. Secure partitioning allows separate access controls to different partitions of data which could be made available based on user, service provider, original equipment manufacturer (OEM), enterprise authentication, or any other type of authentication available. The access controls distinguish between read and write (or erase) permissions and the descriptions of the owners who have the ability to change the access control. For example, the security software may be stored in a first partition, the secure data in a second partition and the biometric data in a third partition. Alternatively, the secure data and the biometric data may be stored in the same partition.

Furthermore, the security software includes password access control software, authentication software, shared key authentication software, public key infrastructure (PKI) authentication software, integrity check software, encryption/decryption software, anti-virus software, anti-spyware software, secure communication software, and any other type of security software available. The security software is stored in the non-volatile memory 102 to provide integrated security capabilities within the memory module 100. Only the security processor 104 accesses the security software from the non-volatile memory 102 and performs security functions based on the specific security software being executed. The security processor 104 controls the entire non-volatile memory storage space and monitors all traffic to and from the non-volatile memory components 102.

Figure 2:
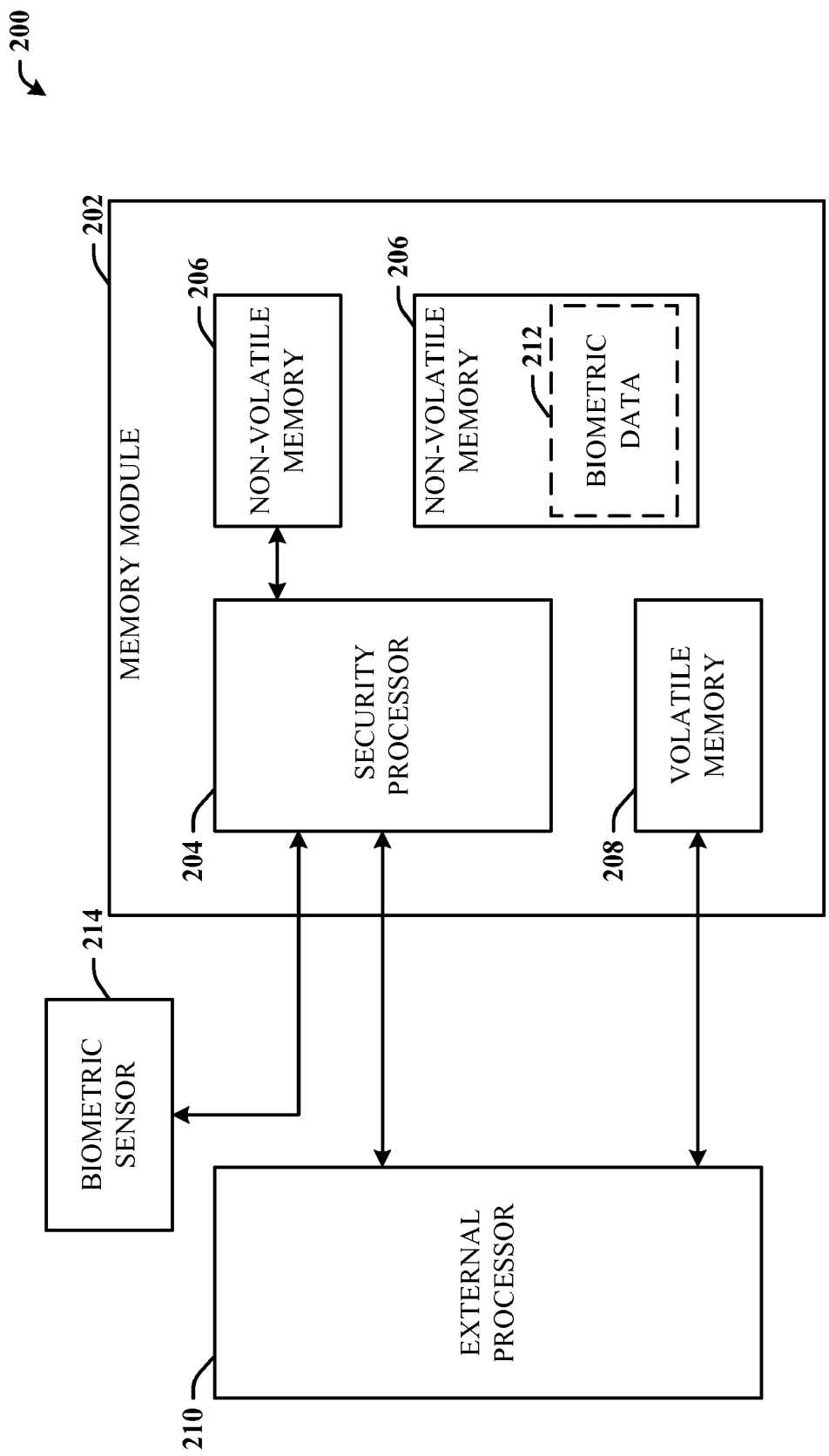
FIG. 2 illustrates a block diagram of a system that controls access to secure data via biometric verification.

FIG. 2 illustrates a system 200 that controls access to secure data via biometric identification in accordance with an innovative aspect. The system 200 includes a memory module 202 that communicates with an external biometric sensor or scanner 214 to capture biometric data and compare it to a previously generated biometric template 212 to establish a heightened level of security for controlling access to assets stored in the non-volatile memory 206. The memory module 202 includes a security processor 204, the non-volatile memory 206, and volatile memory or random access memory (RAM) 208. The volatile memory 208 is used for primary storage and communicates with an external processor 210. The security processor 204 controls the entire non-volatile memory storage and monitors all traffic to and from the non-volatile memory components 206. Further, the security processor 204 provides for concurrent processing of security protocols thereby improving system performance. Because of the secure execution environment within the memory module 202, the communications with the biometric sensor 214 and the assets stored in the non-volatile memory 206 are protected from many of the threats prevalent today.

As stated supra, the biometric data or templates 212 includes iris data, face data, fingerprint data, Deoxyribonucleic acid (DNA), or any other human physical characteristic for identification and authentication purposes. The biometric templates 212 are used as a reference to determine whether a subject should be granted access to manipulate the secure assets stored in the non-volatile memory 206. Specifically, biometric data is collected from a user via the biometric sensor 214, the biometric scanner can include an iris scanner, fingerprint reader or face scanner. The biometric data is then converted via a software application into match points. The software application identifies specific points of data as match points, then these match points are stored as a template in the non-volatile memory 206. The access control rights of the non volatile memory can be set so that the security processor alone has access to the templates stored in the non-volatile memory 206.

When the system needs to identify the user, the security processor 204 will capture the user's biometric data via the biometric sensor 214 then compare the biometric data against biometric templates stored in the non-volatile memory 206 for verification. If the data matches, then notice of successful verification is made available to the external processor 210 and the user or application is allowed access to the secure assets stored in the non-volatile memory 206. The memory module 202 is a secure environment for the storage of the secure data and biometric data 212 stored in the non-volatile memory 206, and the security processor 204 of the memory module 202 analyzes the biometric data and templates 212 to establish a heightened level of security for controlling access to the secure assets stored in the non-volatile memory 206.

The memory module 202 and external processor 210 are integrated to form a mobile device, wherein the memory module 202 is directly embedded into the mobile device. The mobile device includes a multimedia player, a Personal Digital Assistant (PDA), a cellular phone, a hand held computing device, or any other similar wireless computing device.

Additionally, the memory module 202 communicates with an outside or external processor 210 via one or more communication busses, to facilitate the integrated security capabilities. The communication bus could be a NOR or NAND bus or both or a single bus which enables a NOR or NAND Interface. If more than one bus is utilized, both can be functioning in parallel. The external processor 210 is a typical applications processor that handles communications and runs applications. The external processor 210 can be a baseband processor or application processor for a mobile handset, PDA, or the like.

Figure 3:
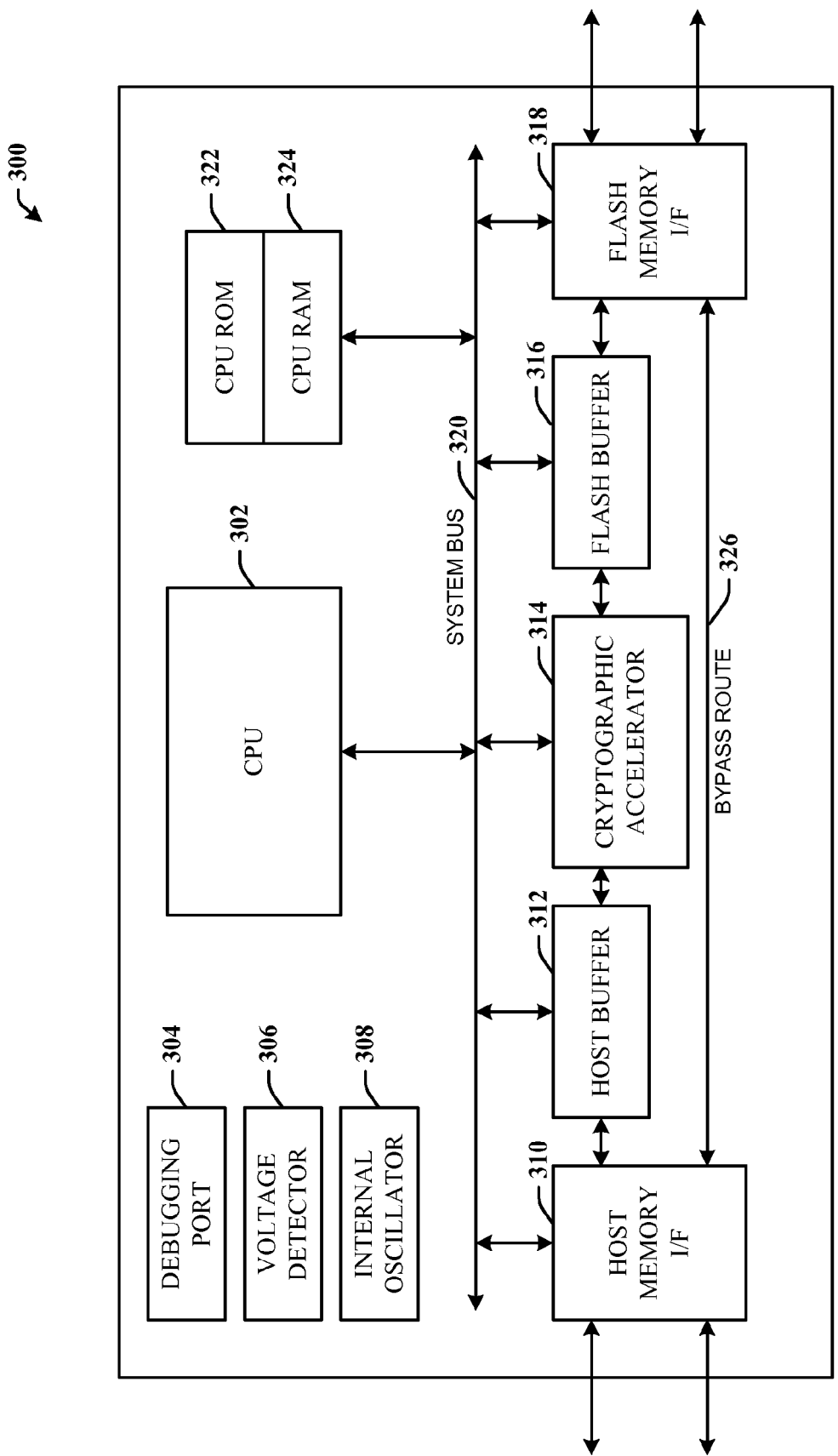
FIG. 3 illustrates a block diagram of a security processor of the memory module.

In more detail, FIG. 3 illustrates the components of a security processor 300. The security processor 300 includes a central processing unit (CPU) 302 or any other type of low power application processor. The CPU 302 within the security processor 300 can manage the flash memory storage (not shown) and provide a secure environment to implement authentication algorithms and security software. The security processor 300 also includes a Joint Test Action Group (JTAG) port 304 for debugging the system with a mechanism to prevent tampering, a voltage detector 306 that indicates the voltage level of the security processor 300 and stops the memory module from functioning when voltage levels are outside of the acceptable range in order to prevent side channel attacks, and an internal oscillator 308 that provides a clock for the security processor 300. This clock may be exported in its present form or it may be divided to provide the clock signal for other components such as a separate NFC RF chip or a fingerprint sensor. However, other mechanisms (not shown) can be provided that help prevent tampering. For example, temperature detecting, metal overlay (to hide signals), and scrambling of signals are additional methods that can be utilized in the security processor 300. A host memory interface (I/F) 310 handles all the flash memory transactions with a host processor (not shown). Specifically the host memory I/F 310 manages signaling, thus complying with the interface definitions of the flash memory. The host memory I/F 310 also manages interpretation or differentiating between a secure and non-secure request, and monitors requests to the non-volatile memory to enforce access rights and permissions.

A host buffer 312 holds data for secured transactions to and from the host processor. The buffer 312 also serves as a mailbox between the CPU 302 and the host processor, wherein interpretation of the messages is carried out by the CPU 302. A cryptographic accelerator 314 that performs all the cryptographic algorithms, symmetric and a-symmetric needed by the system. The CPU 302 configures the cryptographic accelerator 314 and can control the data flow through the security processor 300. The CPU 302 interfaces a system bus 320 and the security applications that run on the CPU 302, arbitrating with the host processor. A flash buffer 316 holds data as it travels to and from the non-volatile or flash memory. The flash buffer 316 enables processing of a page while receiving the next page. A flash memory I/F 318 that handles all transactions to and from the flash memory storage and the security processor 300, such as signaling and interpretation.

A system bus 320 that allows the CPU 302 to communicate with the different components of the security processor 300. CPU ROM/RAM 322 and 324 contains code and data used by the CPU 302. The ROM 322 stores the CPU boot loader (not shown). Further, resident code and code overlays execute from the integrated CPU RAM 324, and are also used for the temporary data storage needs of the CPU 302. In operation, the host processor communicates with the security processor 300 and accesses the flash memory directly via a bypass route 326. Or, the host processor can communicate via the memory manager (not shown) running on the security processor 300 and access the flash memory through communications with the memory manager. In either case, access rights are enforced by the security processor 300 according to the security software embedded in the flash memory and the hardware design of the security processor.

Figure 4:
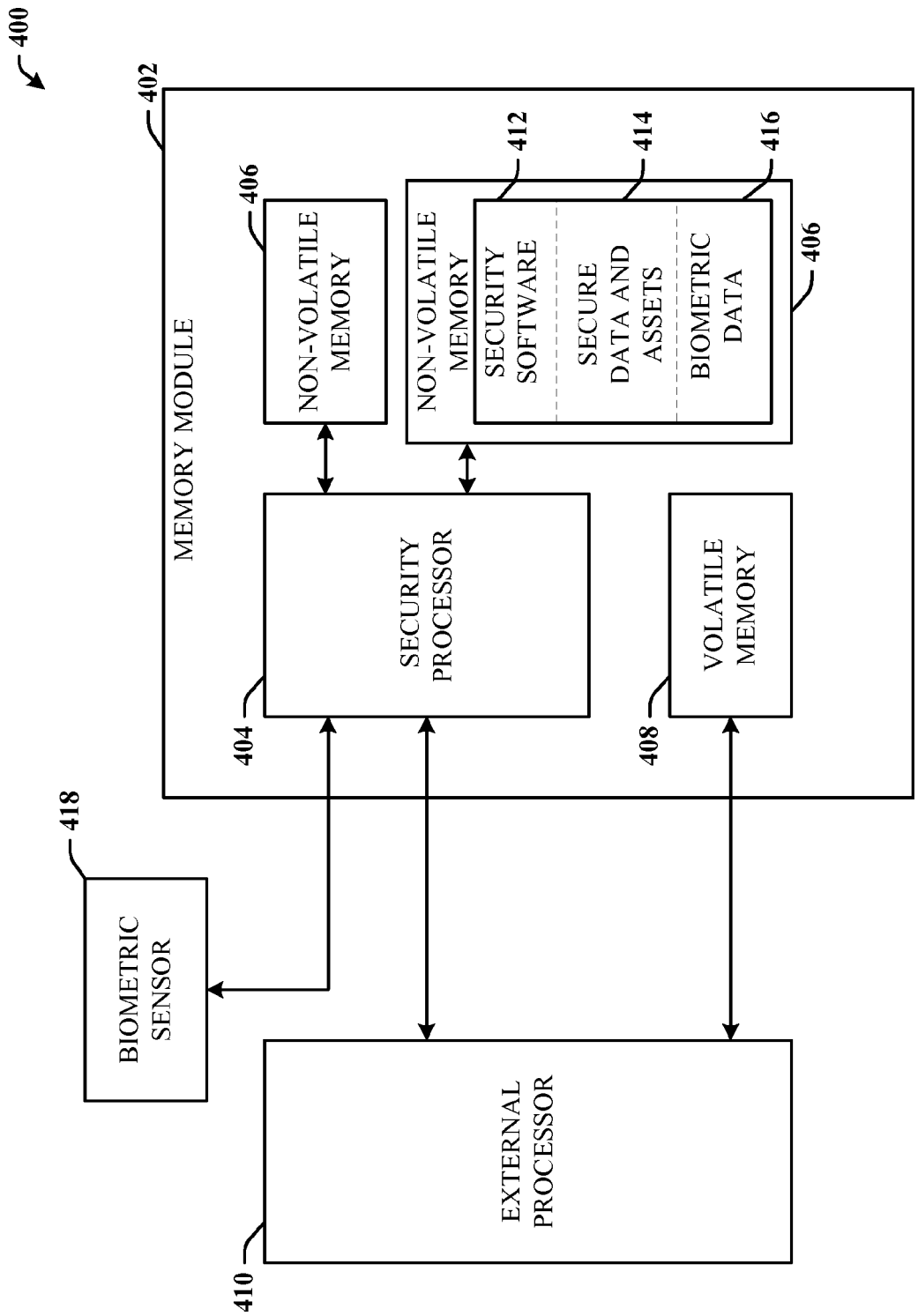
FIG. 4 illustrates a block diagram of a system that controls access to secure data via biometric verification wherein the non-volatile memory component is partitioned.

FIG. 4 illustrates a system 400 that controls access to secure data via biometric verification in accordance with an innovative aspect. The system 400 includes a memory module 402 that communicates with biometric data to establish a heightened level of security for controlling access to data stored in the non-volatile memory 406. The memory module 402 includes a security processor 404, non-volatile memory 406, and volatile memory (i.e., RAM) 408. The volatile memory 408 is used for the temporary data and code storage needs of the external processor 410. The security processor 404 controls the entire non-volatile memory storage and monitors all traffic to and from the non-volatile memory components 406. Further, the security processor 404 provides for concurrent processing of security protocols creating the secure execution environment within the memory module 402 and communicates with the biometric data to control access to secure assets stored in the non-volatile memory 406.

As shown in FIG. 4, the non-volatile memory 406 of the memory module 402 is divided into secure memory partitions of varying sizes and access rights. However, the non-volatile memory 406 is not required to be divided into multiple partitions and can function without the partitions. As stated supra, secure partitioning is utilized to protect essential data and code, secure sensitive information, and allow easy access to common public data. Secure partitioning allows separate access controls to different partitions of data which could be made available based on user, service provider, OEM, enterprise authentication, or any other type of authentication available. The access controls distinguish between read and write (or erase) permissions and the descriptions of the owners who have the ability to change the access control. Specifically as illustrated in FIG. 4, the non-volatile memory 406 is divided into multiple partitions with associated access rights, wherein one partition stores the security software 412, a second partition stores the secure data 414, and a third partition stores the biometric data 416. Alternatively, the secure data 414 and the biometric data 416 may be stored in a single partition. Thus, the non-volatile memory 406 in communication with the security processor 404 creates a secure environment for the assets stored in the non-volatile memory 406. Further, the security processor 404 also communicates with biometric data to establish a heightened level of security for controlling access to the secure data and assets stored in the non-volatile memory 406.

As stated supra, the biometric data is taken from a user via a biometric sensor or scanner, the biometric scanner can include fingerprint, iris or face scanner. The biometric data is then converted via a software application into match points. The software application identifies specific points of data as match points, then these match points are stored as a template in the non-volatile memory. The match points are then translated into a numeric value via an algorithm. The access control rights of the non volatile memory can be set so that the security processor alone has access to the templates stored in the non-volatile memory 406.

The biometric sensor 418 captures the biometric data and communicates the biometric data to the security processor 404. The security processor 404 then compares the biometric data against existing biometric templates stored in the non-volatile memory 406 for verification. If the data matches, then a notice of verification is made available to the external processor 410 and the user or application is allowed access to the secure assets stored in the non-volatile memory 406. Thus, the memory module 402 creates a secure environment for the storage of the secure data and biometric data and templates stored in the non-volatile memory 406, and the security processor 404 of the memory module 402 communicates with the biometric data to establish a heightened level of security for controlling access to the secure data and assets stored in the non-volatile memory 406.

Figure 5:
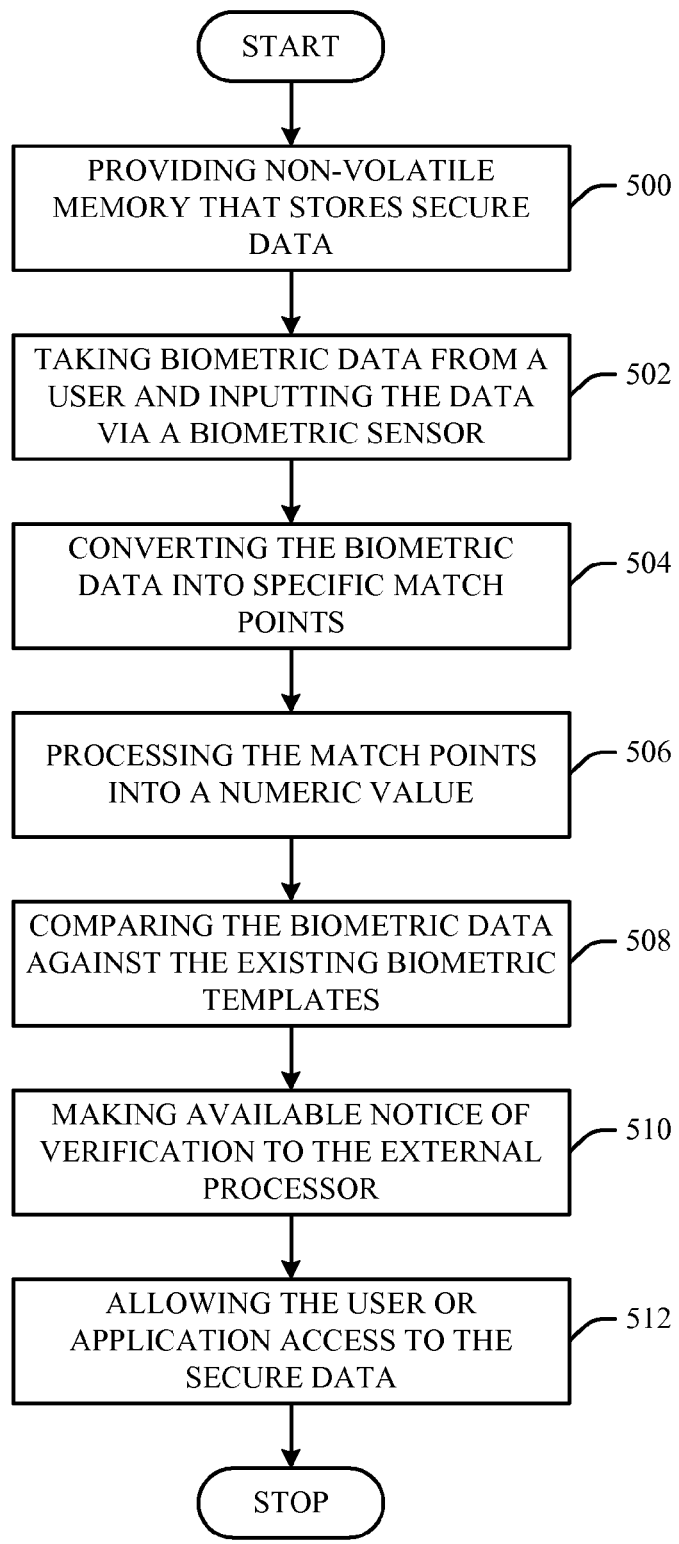
FIG. 5 illustrates a flow chart of a method of utilizing biometric data as an encryption mechanism for accessing secure assets stored in a mobile device.
Figure 6:
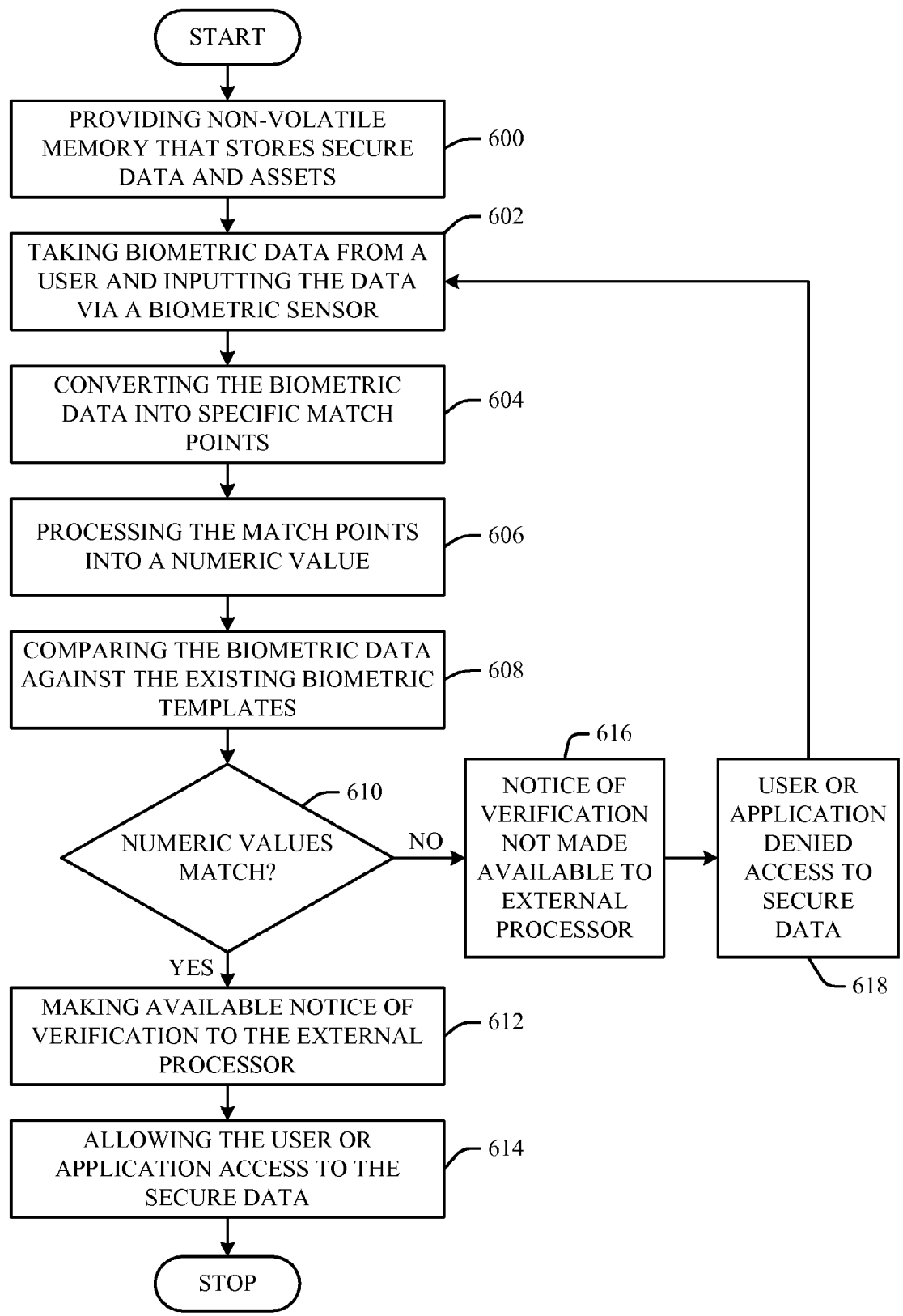
FIG. 6 illustrates a flow chart of a method of utilizing biometric data as an encryption mechanism wherein a user is allowed or denied access to the secure data.
Figure 7:
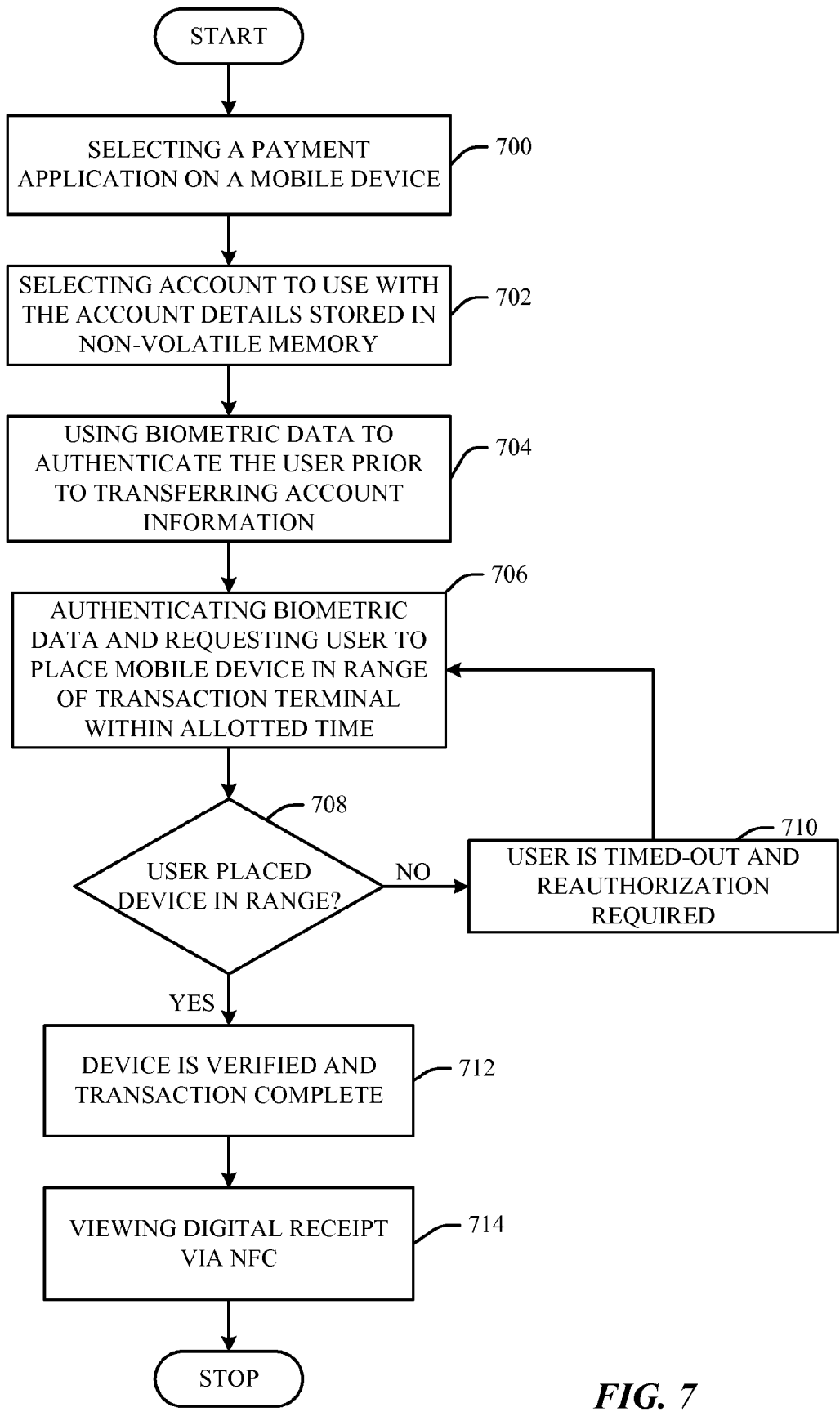
FIG. 7 illustrates a flow chart of a method of controlling access to user account information via biometric data.

FIGS. 5-7 illustrate methodologies of controlling access to secure data via biometric verification according to various aspects of the innovation. While, for purposes of simplicity of explanation, the one or more methodologies shown herein (e.g., in the form of a flow chart or flow diagram) are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Referring to FIG. 5, a method of controlling access to secure data via biometric verification is illustrated. At 500, non-volatile memory is provided that stores the secure data. The non-volatile memory may be divided into secure memory partitions of varying sizes and access rights, wherein one partition stores security software, a second partition stores the secure data, and a third partition stores biometric data. Alternatively, the secure data and the biometric data may be stored together in one partition. At 502, biometric data is taken from a user and input via a biometric sensor. The biometric data includes iris data, face data, fingerprint data, DNA, or any other human physical characteristic for authentication purposes. Specifically, the biometric data is taken from a user via an iris scanner, fingerprint reader or face scanner and communicated to the security processor.

At 504, the biometric data is converted into specific match points. The biometric data is converted via a software application into match points. The software application identifies specific points of data as match points, then these match points are stored as a template and used by the security processor to authenticate a user. At 506, the match points are processed into a numeric value. Typically, the match points are translated into a numeric value via an algorithm.

And at 508, the biometric data is compared against the existing biometric templates stored in the non-volatile memory. The biometric sensor(s) captures biometric data and communicates the biometric data to the security processor. The security processor then compares the biometric data against existing biometric templates stored in the non-volatile memory for verification. Further, a secure execution environment is created by integrating the security processor with the non-volatile memory component to form a memory module. The memory module communicates with the external processor for controlling access to the data stored in the non-volatile memory.

At 510, notice of verification of the data match is made available to the external processor. After the biometric data is compared, verification is made available to the external processor specifying that the data matched. At 512, the user or application is allowed access to the secure assets stored in the non-volatile memory. Thus, the memory module creates a secure environment for the storage of the secure data and biometric data stored in the non-volatile memory, and the security processor of the memory module communicates with the biometric data sensor to establish a heightened level of security for controlling access to data stored in the non-volatile memory.

Referring to FIG. 6, a method of controlling access to secure data via biometric verification is illustrated. At 600, a non-volatile memory is provided that stores the secure data. As stated supra, the non-volatile memory may be divided into secure memory partitions of varying sizes and access rights, wherein one partition stores security software, a second partition stores the secure data, and a third partition stores biometric data. Alternatively, the secure data and the biometric data may be stored in the same partition. At 602, biometric data is taken from a user and input via a security processor. The biometric data includes iris data, face data, fingerprint data, DNA, or any other human physical characteristic for authentication purposes. Specifically, the biometric data is taken from a user via a fingerprint, iris or face scanner and communicated to the security processor.

At 604, the biometric data is converted into specific match points. The biometric data is converted via a software application into match points. The software application identifies specific points of data as match points, these match points are then stored as a template used by the security processor to authenticate a user. At 606, the match points are processed into a numeric value. Typically, the match points are translated into a numeric value via an algorithm.

And at 608, the biometric data is compared against the existing biometric templates stored in the non-volatile memory. The biometric sensor(s) captures biometric data and communicates the biometric data to the security processor. The security processor then compares the biometric data against existing biometric templates stored in the non-volatile memory for verification.

At 610, it is determined whether the biometric data matches. At 612, if the biometric data matches, notification of verification is made available to the external processor. After the biometric data is compared, notification of verification is made available to the external processor specifying that the data matched. At 614, the user or application is allowed access to the secure assets stored in the non-volatile memory. At 616, if the biometric data does not match, notification of verification is not made available to the external processor. And at 618, the user or application is denied access to the secure assets stored in the non-volatile memory. Biometric data may then be taken again from the user and input via the security processor in case an error with the previous biometric input occurred. Thus, the security processor communicates with the biometric data sensor to establish a heightened level of security for controlling access to data stored in the non-volatile memory.

Referring to FIG. 7, a method of controlling access to user account information via biometric data is illustrated. At 700, a user selects a payment application on a mobile device to make a purchase. The menu prompts the user to specify the account, amounts, etc. for the purchase. At 702, the user selects an account to use, wherein the account details are stored in non-volatile memory. The payment may be made from a credit account, a debit account, a pre-paid cash account, or any similar account. The details of each account would be stored inside the non-volatile memory, embedded in the mobile device.

At 704, biometric data is used to authenticate the user prior to transferring account information. Various types of biometric data can be used to authenticate the user, such as iris data, face data, DNA, or any other human physical characteristic for authentication purposes. Specifically, the biometric data is taken from a user via an iris scanner, fingerprint reader, or face scanner and communicated to a security processor. The biometric data is converted into match points and then translated into a numeric value which is compared against existing biometric templates stored in the non-volatile memory. If the data matches, notification of verification is made available to the user and account information is accessed.

At 706, the biometric data is authenticated and the user has some amount of time (perhaps 5-10 seconds) to place the mobile device within the range of a transaction terminal before reauthorization is required. The security processor can use it's internal oscillator to track the elapsed time. The payment protocol is executed between an application stored in the mobile device and a physical point of sale (e.g. end terminal, remote server, another mobile device, etc.). At 708, it is determined whether the user placed the mobile device within the range of a transaction terminal within the allotted time period.

At 710, if the user does not place the mobile device within the range of a transaction terminal within the allotted time period, the user is timed out and reauthorization is required. At 712, if the user does place the mobile device within the range of a transaction terminal within the allotted time period, the terminal verifies the device and the transaction is complete. However, large purchases (i.e., purchases over a set dollar amount), may require a user signature at the terminal for the transaction to be complete. At 714, the user can view the digital receipt received on the mobile device or utilize short message system (SMS) to view transaction details.

Figure 8:
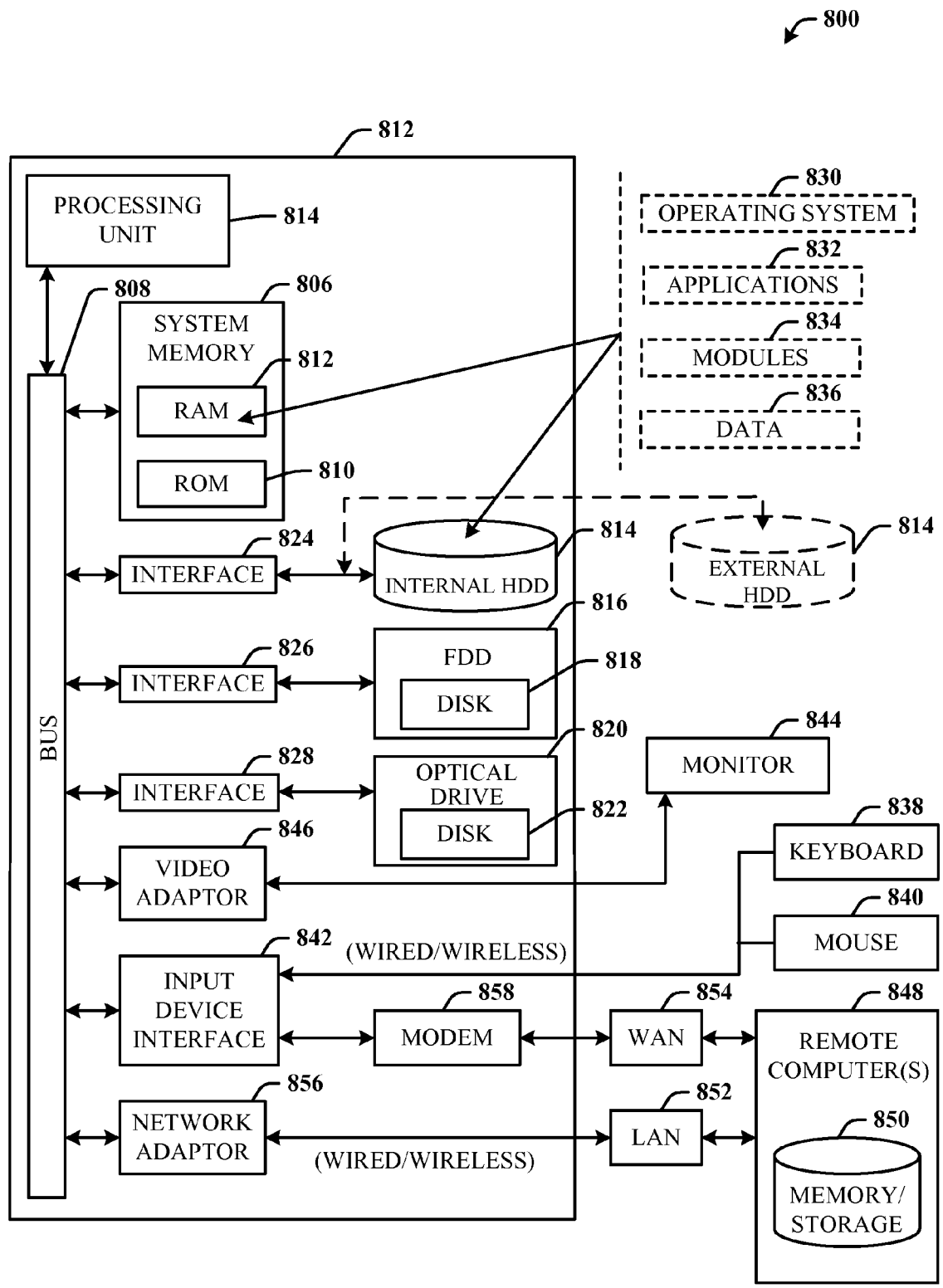
FIG. 8 illustrates a block diagram of a computer operable to execute the disclosed encryption mechanism for accessing secure data architecture.

Referring now to FIG. 8, there is illustrated a block diagram of a computer operable to execute the disclosed encryption mechanism for accessing secure data architecture. In order to provide additional context for various aspects thereof, FIG. 8 and the following discussion are intended to provide a brief, general description of a suitable computing environment 800 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 8, the exemplary environment 800 for implementing various aspects includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 includes read-only memory (ROM) 810 and random access memory (RAM) 812. A basic input/output system (BIOS) is stored in a non-volatile memory 810 such as ROM, EPROM, EEPROM, which BIOS contains the basic routines that help to transfer information between elements within the computer 802, such as during start-up. The RAM 812 can also include a high-speed RAM such as static RAM for caching data.

The computer 802 further includes an internal hard disk drive (HDD) 814 (e.g., EIDE, SATA), which internal hard disk drive 814 may also be configured for external use in a suitable chassis (not shown), a magnetic floppy disk drive (FDD) 816, (e.g., to read from or write to a removable diskette 818) and an optical disk drive 820, (e.g. reading a CD-ROM disk 822 or, to read from or write to other high capacity optical media such as the DVD). The hard disk drive 814, magnetic disk drive 816 and optical disk drive 820 can be connected to the system bus 808 by a hard disk drive interface 824, a magnetic disk drive interface 826 and an optical drive interface 828, respectively. The interface 824 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 812, including an operating system 830, one or more application programs 832, other program modules 834 and program data 836. All or portions of the operating system, applications, modules, and/or data can also be cached in the RAM 812. It is to be appreciated that the innovation can be implemented with various commercially available operating systems or combinations of operating systems.

A user can enter commands and information into the computer 802 through one or more wired/wireless input devices (e.g., a keyboard 838 and a pointing device, such as a mouse 840). Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces, such as a parallel port, an IEEE 1394 serial port, a game port, a USB port, an IR interface, etc.

A monitor 844 or other type of display device is also connected to the system bus 808 via an interface, such as a video adapter 846. In addition to the monitor 844, a computer typically includes other peripheral output devices (not shown), such as speakers, printers, etc.

The computer 802 may operate in a networked environment using logical connections via wired and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wired/wireless connectivity to a local area network (LAN) 852 and/or larger networks (e.g., a wide area network (WAN) 854). Such LAN and WAN networking environments are commonplace in offices and companies, and facilitate enterprise-wide computer networks, such as intranets, all of which may connect to a global communications network (e.g., the Internet).

When used in a LAN networking environment, the computer 802 is connected to the local network 852 through a wired and/or wireless communication network interface or adapter 856. The adaptor 856 may facilitate wired or wireless communication to the LAN 852, which may also include a wireless access point disposed thereon for communicating with the wireless adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wired or wireless device, is connected to the system bus 808 via the serial port interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices (e.g., computers) to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 9:
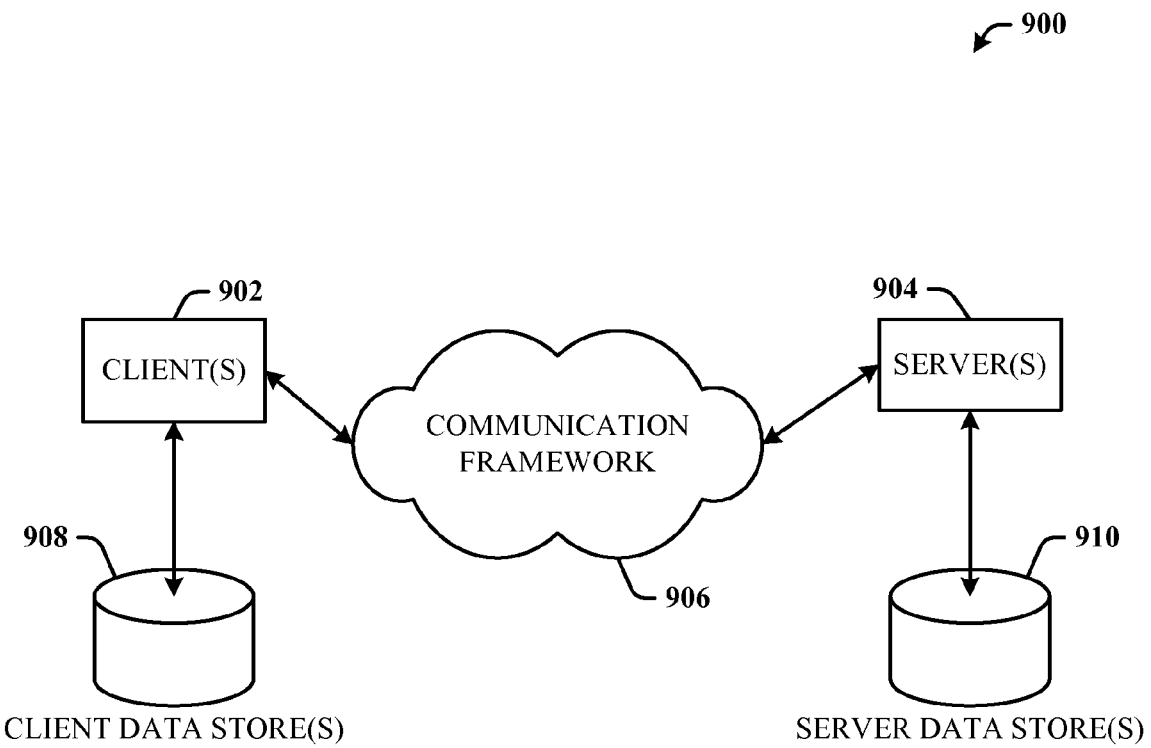
FIG. 9 illustrates a schematic block diagram of an exemplary computing environment for use with the disclosed control access system.

Referring now to FIG. 9, there is illustrated a schematic block diagram of an exemplary computing environment 900 in accordance with another aspect. The system 900 includes one or more client(s) 902. The client(s) 902 can be hardware and/or software (e.g., threads, processes, computing devices). The client(s) 902 can house cookie(s) and/or associated contextual information by employing the subject innovation, for example.

The system 900 also includes one or more server(s) 904. The server(s) 904 can also be hardware and/or software (e.g., threads, processes, computing devices). The servers 904 can house threads to perform transformations by employing the invention, for example. One possible communication between a client 902 and a server 904 can be in the form of a data packet adapted to be transmitted between two or more computer processes. The data packet may include a cookie and/or associated contextual information, for example. The system 900 includes a communication framework 906 (e.g. a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus that secures a transaction via biometric verification, comprising:
a display configured to receive first input that selects a payment application in connection with a transaction;
a biometric sensor configured to receive biometric data; and
a security processor configured to compare the biometric data against a biometric template stored in non-volatile memory and to determine whether the biometric data matches the biometric template within a defined degree of similarity;
wherein the security processor is further configured to send information to the transaction terminal authorizing completion of the transaction in response to a determination that the biometric data matches the biometric template within the defined degree of similarity and if the apparatus is placed within a defined distance from the transaction terminal; and
wherein the security processor is further configured to cancel the transaction if the apparatus is not placed within the defined distance within a defined time limit after the determination that the biometric data matches the biometric template within the defined degree of similarity.

2. The apparatus of claim 1, wherein the biometric data comprises at least one of iris data, face data, fingerprint data, or deoxyribonucleic acid (DNA) data.

3. The apparatus of claim 1, further comprising volatile memory configured to communicate with an external processor, and non-volatile memory configured to store secure data in at least one of a plurality of secure memory partitions having individually controllable access rights.

4. The apparatus of claim 3, wherein the security processor, the external processor, and the non-volatile memory are incorporated to form a mobile device.

5. The apparatus of claim 4, wherein the mobile device comprises one of a multimedia player, a Personal Digital Assistant (PDA), a cell phone, or a hand held computing device.

6. The apparatus of claim 3, wherein the security processor is configured to allow access to the secure data in the at least one of the plurality of secure memory partitions of the non-volatile memory in response to a determination that the biometric data matches the biometric template within the defined degree of similarity.

7. The apparatus of claim 6, wherein the security processor is configured to issue a notice of verification to the external processor in response to the determination that the biometric data matches the biometric template within the defined degree of similarity.

8. The apparatus of claim 3, wherein the non-volatile memory is configured to store security software on a first of the plurality of secure memory partitions, the secure data on a second of the plurality of secure memory partitions, and the biometric data on a third of the plurality of secure memory partitions, wherein the security software includes at least a biometric validation algorithm for use by the security processor.

9. The system of apparatus 8, wherein the security software is configured to identify points of data of the biometric data as match points, and to store the match points as a template for use by the security processor to authenticate subsequent biometric data.

10. The apparatus of claim 9, wherein the security processor is configured to collect the biometric data through a direct connection with a biometric sensor.

11. The apparatus of claim 10, wherein the security processor and biometric sensor are configured to communicate through an encrypted channel.

12. The apparatus of claim 11, wherein the encrypted channel is enabled through use of a common secret key.

13. The system of claim 3, wherein the security processor is configured to deny access to a subset of the plurality of secure memory partitions based on a comparison of the biometric data against the biometric template.

14. The apparatus of claim 1, wherein the display is further configured to receive second input that selects an account to be used for the transaction.

15. The apparatus of claim 1, wherein the security processor includes a voltage detector configured to indicate whether voltage levels of the security processor are outside an acceptable range, and an internal oscillator that provides a clock to the security processor, wherein the clock provides a clock signal employed by a separate near field communication (NFC) radio frequency (RF) chip or a biometric sensor utilized to obtain the biometric data.

16. A method of controlling access to secure data via biometric verification, comprising:
  selecting a payment application for conducting a payment transaction via a mobile device;
  inputting biometric data into the mobile device;
  converting the biometric data into specified match points;
  processing the match points into a numeric value;
  comparing the numeric value against a biometric template stored in a non-volatile memory of the mobile device; and
  if the comparing determines that the numerical value matches the biometric template within a defined tolerance:
    initiating a timer having a defined timeout value;
    in response to determining that the mobile device is located within a defined range of a transaction terminal before the timer has reached the defined timeout value:
      sending an indication from the mobile device to the transaction terminal validating the payment transaction, and
    in response to determining that the mobile device has not been located within the defined range before the timer has reached the defined timeout value:
      cancelling the payment transaction.

17. The method of claim 16, further comprising:
  identifying points of data within the biometric data as match points;
  storing the match points as a template; and
  employing the match points to subsequently received biometric data.

18. The method of claim 17, further comprising:
  storing security software on a first partition of a non-volatile memory of the mobile device, the security software comprising at least a biometric validation algorithm for performing the comparing;
  storing secure data on a second partition of the non-volatile memory; and
  storing the biometric data on a third partition of the non-volatile memory.

19. The method of claim 18, further comprising preventing access to the secure data in response to determining that a voltage level associated with a security processor controlling access to the non-volatile memory falls outside an acceptable range.

20. The method of claim 18, further comprising allowing access to the secure data if the comparing determines that the numerical value matches the biometric template within the defined tolerance.

21. A method of controlling access to account information via biometric data, comprising:
  selecting a payment application on a mobile device in connection with a purchase transaction;
  selecting an account to use for the purchase transaction, wherein information regarding the account is stored in a first secure partition of a non-volatile memory of the mobile device that is divided into multiple secure partitions;
  receiving biometric data at the mobile device;
  confirming that the biometric data matches a biometric template stored in a second secure partition of the non-volatile memory;
  initiating a timer in response to the confirming;
  determining that the mobile device has been placed within range of a transaction terminal before the timer reaches a defined timeout value;
  transmitting a validation output to a transaction terminal authorizing the purchase transaction in response to the determining; and
  cancelling the purchase transaction in response to determining that the mobile device has not been placed within range of the transaction terminal before the timer reaches the defined timeout value.

22. The method of claim 21, wherein the account comprises at least one of a credit account, a debit account, or a pre-paid cash account.

23. The method of claim 21, wherein the receiving the biometric data includes receiving the biometric data from at least one of an iris scanner, a fingerprint reader, a face scanner, or a deoxyribonucleic acid (DNA) scanner.

* * * * *